(12) United States Patent
Morooka

(10) Patent No.: US 8,609,232 B2
(45) Date of Patent: Dec. 17, 2013

(54) LOW PERMEABILITY RUBBER LAMINATE AND PNEUMATIC TIRE USING THE SAME

(75) Inventor: Naoyuki Morooka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 932 days.

(21) Appl. No.: 12/279,790

(22) PCT Filed: Mar. 2, 2007

(86) PCT No.: PCT/JP2007/054620
§ 371 (c)(1),
(2), (4) Date: Aug. 18, 2008

(87) PCT Pub. No.: WO2007/100159
PCT Pub. Date: Sep. 7, 2007

(65) Prior Publication Data
US 2008/0314490 A1    Dec. 25, 2008

(30) Foreign Application Priority Data

Mar. 3, 2006    (JP) .................... 2006-058264

(51) Int. Cl.
| | | |
|---|---|---|
| B32B 27/32 | (2006.01) | |
| B32B 9/04 | (2006.01) | |
| B32B 13/12 | (2006.01) | |
| B32B 25/12 | (2006.01) | |
| B32B 27/00 | (2006.01) | |
| B32B 27/08 | (2006.01) | |

(52) U.S. Cl.
USPC ........... 428/220; 428/447; 428/451; 428/492; 428/494; 428/500; 428/515

(58) Field of Classification Search
USPC ........... 152/510; 428/220, 492, 500; 542/495, 542/496
See application file for complete search history.

(56) References Cited

U.S. PATENT DOCUMENTS

| | | | | |
|---|---|---|---|---|
| 3,768,537 A | * | 10/1973 | Hess et al. ................. | 152/209.5 |
| 5,040,583 A | * | 8/1991 | Lin et al. ....................... | 152/510 |
| 5,726,237 A | * | 3/1998 | Satoh et al. .................... | 524/495 |
| 6,062,283 A | * | 5/2000 | Watanabe et al. ............. | 152/510 |
| 6,380,411 B1 | * | 4/2002 | Luginsland et al. ............. | 556/9 |
| 6,880,600 B1 | * | 4/2005 | Bidet ............................. | 152/510 |
| 2002/0115767 A1 | * | 8/2002 | Cruse et al. .................... | 524/262 |
| 2004/0089388 A1 | * | 5/2004 | Fujino et al. .................. | 152/510 |
| 2011/0011507 A1 | * | 1/2011 | Morooka ...................... | 152/510 |

FOREIGN PATENT DOCUMENTS

| | | | | |
|---|---|---|---|---|
| CN | 1308080 | A | 8/2001 | |
| EP | 0719658 | A1 | 7/1996 | |
| EP | 10940647 | A1 | 4/2001 | |
| EP | 1195402 | A1 | 4/2002 | |
| EP | 1418199 | A1 | 5/2004 | |
| EP | 1419903 | A1 | 5/2004 | |
| JP | 51-53541 | * | 5/1976 | ............. C08L 23/00 |
| JP | 01314164 | | 12/1989 | |
| JP | 5-295119 | A | 11/1993 | |
| JP | 7-118471 | A | 5/1995 | |
| JP | 09-124852 | | 5/1997 | |
| JP | 10292127 | A * | 11/1998 | |
| JP | 2001-172295 | | 6/2001 | |
| JP | 2002052904 | | 2/2002 | |
| JP | 2002079804 | | 3/2002 | |
| JP | 2004-176048 | | 6/2004 | |
| JP | 2005-247985 | | 9/2005 | |
| JP | 2005-247985 | A | 9/2005 | |
| JP | 2006167919 | | 6/2006 | |
| WO | WO-2007037541 | | 4/2007 | |

OTHER PUBLICATIONS

Supplementary European Search Report dated Oct. 6, 2009, Application No. 07738105.1.

* cited by examiner

*Primary Examiner* — Sheeba Ahmed
(74) *Attorney, Agent, or Firm* — Novak Druce Connolly Bove + Quigg LLP

(57) ABSTRACT

A low permeability rubber laminate having an excellent bondability, air pressure retaining property and durability and containing (A) at least one low permeability resin layer having an average thickness d of 0.05 µm<d<5 µm containing an ethylene vinyl alcohol copolymer having an ethylene composition ratio of 20 to 50 mol % and a degree of saponification of 90% or more and (B) at least one diene-based rubber composition layer containing 1 to 25 parts by weight of a silane-based coupling agent having a functional group reactive with rubber and having an alkoxysilyl group, based upon 100 parts by weight of the diene-based rubber and a pneumatic tire using the same as an inner liner.

14 Claims, No Drawings

LOW PERMEABILITY RUBBER LAMINATE AND PNEUMATIC TIRE USING THE SAME

This application is a national phase of PCT/JP2007/054620, filed Mar. 2, 2007, which claims priority to JP 2006-058264, filed Mar. 3, 2006, the entire contents of all are hereby incorporated by reference.

TECHNICAL FIELD

The present invention relates to a low air permeability rubber laminate and a pneumatic tire using the same, more particularly relates to a low air permeability rubber laminate comprising a low air permeability ethylene vinyl alcohol copolymer (EVOH) film laminated on a rubber composition to increase the bondability, gas barrier property and durability suitable for use as an air barrier layer (or inner liner) and a pneumatic tire using the same.

BACKGROUND ART

An ethylene vinyl alcohol copolymer (EVOH) has an excellent gas barrier property, and, therefore the use thereof as an air barrier layer is being studied. For example, Japanese Patent Publication (A) No. 1-314164 discloses an air permeation preventive structure comprising a laminate of EVOH and an elastomer (rubber). However, when EVOH and rubber are being laminated, direct bonding of a diene-based rubber having a particularly low polarity (e.g., SBR, NR, BR) and EVOH having a very high polarity is very difficult. For this reason, the use of a primer, adhesive, etc. is necessary for bonding, but even in this case, there are problems that the bonding capability and durability are still insufficient, and further the production process becomes troublesome, etc.

DISCLOSURE OF THE INVENTION

Accordingly, an object of the present invention is to provide a low air permeability rubber laminate having an excellent bondability, durability, and air pressure retention property comprising a low air permeability ethylene vinyl alcohol copolymer (EVOH) layer so as to enable the use thereof as, for example, a pneumatic tire's air permeation preventive layer (inner liner).

In accordance with the present invention, there is provided a low permeability rubber laminate comprising (A) at least one low permeability resin layer having an average thickness d of 0.05 µm<d<5 µm containing an ethylene vinyl alcohol copolymer having an air permeation coefficient at 30° C., determined according to JIS K7126, of $0.5 \times 10^{-12}$ cc·cm/cm$^2$·sec·cmHg or less and having an ethylene component ratio of 20 to 50 mol % and a degree of saponification of 90% or more and (B) at least one diene-based rubber composition layer containing 1 to 25 parts by weight based upon 100 parts by weight of the diene-based rubber, of a silane-based coupling agent having a functional group capable of reacting with a rubber and having an alkoxysilyl group.

In accordance with the present invention, there is further provided a pneumatic tire using the above laminate as an inner liner.

The laminate according to the present invention comprises an EVOH layer laminated on the specified rubber composition layer and has a good bondability as well, and, therefore, a laminate having an excellent gas barrier property and durability is obtained and can be suitably used as an inner liner of a pneumatic tire.

BEST MODE FOR CARRYING OUT THE INVENTION

The inventors engaged in intensive research for the purpose of solving the above problem, that is, to provide a lower permeability rubber laminate capable of improving the bondability between an EVOH thin layer and a diene-based rubber when using a low permeability resin (e.g., EVOH) as an air permeation preventive layer and laminating and vulcanizing the same with rubber and having an excellent gas barrier property and durability (i.e., characteristic of not peeling off even with dynamic deformation). Since the direct bonding of a polymer having almost no polarity, i.e., a tire use diene-based rubber (e.g., SBR, NR, BR, etc.) with EVOH having an extremely high polarity is difficult, and therefore, in order to improve the bondability thereof, the use of a primer or adhesive was necessary in the part. The inventors found that, by compounding a silane-based coupling agent containing a functional group (e.g., a sulfur element) capable of reacting with rubber into the tire use rubber, the bonding strength with the EVOH after vulcanization can be remarkably improved, without using a primer or adhesive.

The low permeability resin (or composition) (A) for forming a layer of the laminate according to the present invention can be any thermoplastic resin satisfying the above requirements, but, as a preferable resin composition, the low permeability resin composition is an ethylene vinyl alcohol copolymer (EVOH) having an ethylene component ratio of 20 to 50 mol %, preferably 25 to 40 mol %, and a degree of saponification of 90% or more, preferably 95% or more, more preferably 99 to 100%, and having an average thickness d of 0.05 µm<d<5 µm, preferably 1 to 3 µm. If this thickness is too small, a sufficient gas barrier property cannot be obtained, so this is not preferable, while conversely if too large, the resistance to stretch flex fatigue becomes poor, so this is not preferred.

The ethylene vinyl alcohol copolymer (EVOH) having an ethylene component ratio of 20 to 50 mol % and a degree of saponification of 90% or more usable in the present invention is a known copolymer. For example, it can be produced by hydrolyzing (saponifying) an ethylene-vinyl acetate copolymer (EVA) obtained by, for example, a radical polymerization of ethylene and vinyl acetate. In the present invention, commercially available products such as Eval L171B (ethylene component ratio of 26 mol %, made by Kuraray), Eval H171B (ethylene component ratio of 38 mol %, made by Kuraray) may be used alone or in any combinations thereof.

The low permeability resin composition (A) usable as one layer of the laminate of the present invention may contain, in addition to the EVOH ingredient, an antioxidant, anti-aging agent, coloring agent, plasticizer, filler, processing aid, or other various types of additives generally compounded in resin compositions. These additives may be mixed with the resin by a general method to obtain a composition, which is used for the lamination. The compounding amounts of these additives may be made the conventional general amounts so long as the object of the present invention is not adversely affected.

The diene-based rubber composition (B) for forming another layer of the laminate according to the present invention may include one or more ingredients selected from diene-based rubbers (e.g., natural rubbers (NR), isoprene rubbers (IR), butadiene rubbers (BR), halogenated butyl rubbers (e.g., brominated butyl rubber (Br-IIR), chlorinated butyl rubber (Cl-IIR), ethylene-propylene copolymer rubbers (EPM, EPDM), and styrene-based elastomers (e.g., styrene-butadiene rubber (SBR) and styrene-butadiene-styrene block copolymer (SBS)), etc.

The diene-based rubber composition (B) for forming the above-mentioned layer of the laminate according to the present invention contains a compound having a functional group capable of reacting with rubber, for example, the sulfur element itself or a group or bond containing sulfur in the molecules thereof (e.g., a mercapto group and a polysulfide bond (e.g., disulfide, trisulfide, and tetrasulfide)) and having an alkoxysilyl group (i.e., a silane-based coupling agent), in an amount, based upon 100 parts by weight of diene-based rubber, of 1 to 25 parts by weight, preferably 2 to 15 parts by weight. If the compounding amount is small, sufficient bondability with the EVOH layer cannot be imparted, so this is not preferable, while conversely if too large, the degree of the cross-linking of the rubber becomes high and the durability of the rubber is decreased, so this is not preferable. The silane-based coupling agent is a known compound. For example, commercially available agent such as bis (triethoxysilylpropyl)tetrasulfide, 3-mercaptopropylmethyldimethoxysilane, 3-mercaptopropyltrimethoxysilane may be used.

The rubber composition (B) for forming a layer of the laminate according to the present invention may contain, in addition to the above-mentioned rubber ingredient, a filler such as carbon black, silica, a vulcanization or cross-linking agent, a vulcanization or cross-linking accelerator, various types of oils, an antioxidant or antiaging agent, a plasticizer, or other various types of additives generally compounded for tire use or other rubber composition use. These additives may be mixed by a general method to obtain a composition for vulcanization or cross-linking. The compounding amounts of these additives may be made the conventional general compounding amounts so long as the object of the present invention is not adversely affected.

EXAMPLES

Examples will now be used to further illustrates the present invention, but the present invention is by no means limited to these Examples.

The formulations of the EVOH composition forming the layer (A) and the formulations of the rubber composition forming the layer (B) according to the formulations shown in Table I are shown in Table I.

Examples 1 to 6 and Comparative Examples 1 to 7

Laminates of a low permeability resin (EVOH) and a rubber were prepared by the following method. The EVOH shown in Table I was dissolved in a solvent (i.e., a mixed solvent of water/isopropyl alcohol, 50/50 w/w) and adjusted to a concentration of 10% by weight to prepare an EVOH solution. (Note: When a silane coupling agent is compounded into the EVOH, a predetermined amount of silane coupling agent is compounded into this solution.)

The above EVOH solution was coated on a polyethylene (PE) film and the solvent was evaporated to obtain an EVOH thin layer having a uniform thickness (thickness is shown in Table I). Next, the EVOH laminated on PE was laminated on a rubber composition having a thickness of 0.5 mm shown in Table I to obtain a PE/EVOH/rubber composition. The PE was peeled off to obtain an EVOH/rubber composition laminate, then a rubber composition having a thickness of 0.5 mm was laminated on the EVOH side to obtain a low permeability rubber laminate comprised of three layers of a rubber composition/EVOH/rubber composition. The method of preparation of the EVOH/rubber composition is not limited to the above technique. Next, this (B) layer laminate was used, instead of the inner liner, to prepare a tire (i.e., size 195/65R14 (rim 14×6JJ) under the conditions of a vulcanization temperature of 190° C.

This tire was used for an indoor tire running test (conditions: air pressure of 140 kPa, pressed by load of 6kN against drum of speed corresponding to speed of 80 km/h, 5000 km running). The results are shown in Table I.

TABLE I

| | Comp. Ex. 1 | Comp. Ex. 2 | Comp. Ex. 3 | Comp. Ex. 4 | Comp. Ex. 5 | Ex. 1 | Ex. 2 |
|---|---|---|---|---|---|---|---|
| EVOH formulation (parts by weight) | | | | | | | |
| EVOH (L171B, ethylene 27 mol %)*1 | 100 | 100 | 100 | 100 | 100 | 100 | 100 |
| EVOH (G156, ethylene 47 mol %)*2 | 0 | 0 | 0 | 0 | 0 | 0 | 0 |
| Mercaptosilane*3 | 0 | 10 | 30 | 0 | 0 | 0 | 0 |
| Formulation of rubber composition (parts by weight) | | | | | | | |
| Natural rubber*4 | 50 | 50 | 50 | 50 | 50 | 50 | 50 |
| SBR*5 | 50 | 50 | 50 | 50 | 50 | 50 | 50 |
| Oil*6 | 5 | 5 | 5 | 5 | 5 | 5 | 5 |
| Sulfur*7 | 2 | 2 | 2 | 2 | 2 | 2 | 2 |
| Vulcanization accelerator*8 | 1 | 1 | 1 | 1 | 1 | 1 | 1 |
| Stearic acid*9 | 0.75 | 0.75 | 0.75 | 0.75 | 0.75 | 0.75 | 0.75 |
| Zinc oxide*10 | 3 | 3 | 3 | 3 | 3 | 3 | 3 |
| Carbon black*11 | 50 | 50 | 50 | 50 | 50 | 50 | 50 |
| Silane coupling agent (parts by weight) | | | | | | | |
| Mercaptosilane*12 | — | — | — | — | 0.5 | 2 | 18 |
| Si69*13 | — | — | — | — | — | — | — |
| Mercaptosilane coating | No | No | No | Yes | No | No | No |
| (A) layer gauge thickness (μm) | 2 | 2 | 2 | 2 | 2 | 2 | 2 |

TABLE I-continued

| Indoor tire running test (peeling) | Yes | Yes | Yes | Yes | Yes | No | No |
|---|---|---|---|---|---|---|---|
| Judgment | Poor | Poor | Poor | Poor | Poor | Good | Good |

|  | Ex. 3 | Ex. 4 | Ex. 6 | Ex. 6 | Comp. Ex. 6 | Comp. Ex. 7 |
|---|---|---|---|---|---|---|
| EVOH formulation (parts by weight) | | | | | | |
| EVOH (L171B, ethylene 27 mol %)*1 | 0 | 0 | 100 | 100 | 100 | 100 |
| EVOH (G156, ethylene 47 mol %)*2 | 100 | 100 | 0 | 0 | 0 | 0 |
| Mercaptosilane*3 | 0 | 0 | 0 | 0 | 0 | 0 |
| Formulation of rubber composition (parts by weight) | | | | | | |
| Natural rubber*4 | 50 | 50 | 50 | 50 | 50 | 50 |
| SBR*5 | 50 | 50 | 50 | 50 | 50 | 50 |
| Oil*6 | 5 | 5 | 5 | 5 | 5 | 5 |
| Sulfur*7 | 2 | 2 | 2 | 2 | 2 | 2 |
| Vulcanization accelerator*8 | 1 | 1 | 1 | 1 | 1 | 1 |
| Stearic acid*9 | 0.75 | 0.75 | 0.75 | 0.75 | 0.75 | 0.75 |
| Zinc oxide*10 | 3 | 3 | 3 | 3 | 3 | 3 |
| Carbon black*11 | 50 | 50 | 50 | 50 | 50 | 50 |
| Silane coupling agent (parts by weight) | | | | | | |
| Mercaptosilane*12 | 2 | 18 | — | — | 30 | 2 |
| Bis(triethoxysilylpropyl) tetrasulfide*13 | — | — | 10 | 18 | — | — |
| Mercaptosilane coating | No | No | No | No | No | No |
| (A) layer gauge thickness (μm) | 2 | 2 | | | 2 | 10 |
| Indoor tire running test (peeling) | No | No | No | No | Rubber broken | (A) layer cracked and peeled off |
| Judgment | Good | Good | Good | Good | Poor | Poor |

Notes of Table I
*1Eval L171B (saponification degree 99% or more) made by Kuraray
*2Eval G156 (saponification degree 99% or more) made by Kuraray
*3KBM-803 made by Shinetsu Silicon
*4PT. NOSIRA SIR20
*5Tufden 1000R made by Asahi Kasei Chemicals
*6Extract No. 4S made by Showa Shell Oil
*7Crystex HS OH 20 made by Akzo Nobel
*8Noccelar CZ-G made by Ouchi Shinko Chemical Industrial
*9Stearic acid made by BF Goodrich
*10Zinc Oxide No. 3 made by Seido Chemical Industry
*11HTC#G made by NSC Chemical Carbon
*12KBM-803 made by Shinetsu Silicon
*13Si69 made by Degussa Comparative Example 1 is a low permeability rubber laminate obtained by laminating and vulcanizing an EVOH film and a rubber composition not containing any silane-based coupling agent, but this laminate is poor in bondability/adhesion. After the tire running test, the rubber layer blistered due to interfacial peeling, so this is not preferred. Comparative Examples 2 to 3 are low permeability rubber laminates obtained by laminating and vulcanizing a film obtained by compounding mercaptosilane in an EVOH solution, followed by casting. The resultant film and a rubber composition were laminated and vulcanized. These laminates are poor in bondability/adhesion and had interfacial peeling/rubber blisters after the tire use, so are not preferable. Comparative Example 4 is a low permeability rubber laminate obtained by coating mercaptosilane on an EVOH film and laminating and vulcanizing this with a rubber composition. However, even if coating mercaptosilane as a primer, the bondability/adhesion is poor and, after the tire is run on, the rubber layer blisters due to interfacial peeling, so this is not preferable. Comparative Example 5 compounds 0.5 part by weight of mercaptosilane into the rubber composition, but the compounding amount is too small, so sufficient bondability cannot be obtained and the rubber layer blisters due to interfacial peeling, so this is not preferable.

Examples 1 to 4 are low permeability rubber laminates obtained by laminating a rubber composition comprised of rubber, into which mercaptosilane is compounded and mixed, with EVOH followed by vulcanizing. The excellent bondability was obtained.

Comparative Example 6 has too much compounding amount of mercaptosilane, so is too high in cross-linking density of the rubber composition, which results in the rubber layer compreferably breaking during the running, while Comparative Example 7 has too thick EVOH layer, which results in compreferable cracking and peeling off.

Examples 5 to 6 are Examples of low permeability rubber laminates obtained by using Si69 as the silane coupling agent and laminating and vulcanizing thereof with EVOH. These also exhibit excellent bondability.

Industrial Applicability

A polymer having almost no polarity, that is, a tire use diene-based rubber (SBR, NR, or BR), and EVOH having an extremely high polarity are difficult to directly bond. In the past, the use of a primer or an adhesive had been necessary. However, in the present invention, it is possible to compound, into a tire use rubber composition, a silane-based coupling agent having a functional group capable of reacting with the rubber so that the bonding strength with the EVOH after vulcanization is remarkably improved, therefore a low permeability rubber laminate having an excellent gas barrier property and durability (i.e., characteristics of not peeling off even with dynamic deformation) is obtained.

The invention claimed is:

1. A low permeability rubber laminate comprising (A) at least one low permeability resin layer having an average thickness d of 0.05 μm<d<5 μm containing an ethylene vinyl alcohol copolymer (EVOH) having an air permeation coefficient at 30° C., determined according to JIS K7126, of $0.5 \times 10^{-12}$ cc·cm/cm$^2$·sec·cmHg or less and having an ethylene component ratio of 20 to 50 mol % and a degree of saponification of 90% or more and (B) at least one diene-based rubber composition layer containing at least one diene-based rubber selected from the group consisting of natural rubbers (NR), isoprene rubbers (IR), butadiene rubbers (BR) and styrene-butadiene copolymer rubbers (SBR) and 1 to 25 parts by weight, based upon 100 parts by weight of the diene-based rubber, of a silane-based coupling agent, as a bonding agent strength improver with the EVOH, having a functional group capable of reacting with a rubber and having an alkoxysilyl group, wherein said rubber composition contains, as a filler, only carbon black.

2. A low permeability rubber laminate as claimed in claim 1, wherein the diene-based rubber composition (B) comprises the silane-based coupling agent, as a bonding agent strength improver with the EVOH, having a sulfur element or a group or bond containing sulfur in the molecules thereof or having an alkoxysilyl group in an amount of 2 to 15 parts by weight.

3. A low permeability rubber laminate as claimed in claim 1, wherein the rubber composition (B) further comprises a vulcanization agent and a vulcanization accelerator.

4. A low permeability rubber laminate as claimed in claim 1, wherein the silane-based coupling agent, as a bonding agent strength improver with the EVOH, contains sulfur in the molecule thereof.

5. A low permeability rubber laminate as claimed in claim 1, wherein the silane-based coupling agent, as a bonding agent strength improver with the EVOH, contains a mercapto group in the molecule thereof 6. A pneumatic tire using a low permeability rubber laminate according to claim 1 as an inner liner.

7. A low permeability rubber laminate as claimed in claim 2, wherein the rubber composition (B) further comprises a vulcanization agent and a vulcanization accelerator.

8. A low permeability rubber laminate as claimed in claim 3, wherein the silane-based coupling agent, as a bonding agent strength improver with the EVOH, contains sulfur in the molecule thereof.

9. A low permeability rubber laminate as claimed in claim 2, wherein the silane-based coupling agent, as a bonding agent strength improver with the EVOH, contains a mercapto group in the molecule thereof 10. A low permeability rubber laminate as claimed in claim 3, wherein the silane-based coupling agent, as a bonding agent strength improver with the EVOH, contains a mercapto group in the molecule thereof.

11. A pneumatic tire using a low permeability rubber laminate according to claim 2 as an inner liner.

12. A pneumatic tire using a low permeability rubber laminate according to claim 3 as an inner liner.

13. A pneumatic tire using a low permeability rubber laminate according to claim 4 as an inner liner.

14. A low permeability rubber laminate consisting essentially of:
(A) at least one low permeability resin layer having an average thickness d of 0.05 μm<d<5 μm containing an ethylene vinyl alcohol copolymer having an air permeation coefficient at 30° C., determined according to JIS K7126, of $0.5 \times 10^{-12}$ cc·cm/cm$^2$·sec·cmHg or less and having an ethylene component ratio of 20 to 50 mol % and a degree of saponification of 90% or more and
(B) at least one diene-based rubber composition layer containing at least one diene-based rubber selected from the group consisting of natural rubbers (NR), isoprene rubbers (IR), butadiene rubbers (BR) and styrene-butadiene copolymer rubbers (SBR) and 1 to 25 parts by weight, based upon 100 parts by weight of the diene-based rubber, of a silane-based coupling agent, as a bonding agent strength improver with the EVOH, having a functional group capable of reacting with a rubber and having an alkoxysilyl group.

* * * * *

UNITED STATES PATENT AND TRADEMARK OFFICE
CERTIFICATE OF CORRECTION

PATENT NO. : 8,609,232 B2 Page 1 of 1
APPLICATION NO. : 12/279790
DATED : December 17, 2013
INVENTOR(S) : Naoyuki Morooka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this
Twenty-second Day of September, 2015

Michelle K. Lee
*Director of the United States Patent and Trademark Office*